US006797370B1

(12) United States Patent
Bechtoldt et al.

(10) Patent No.: US 6,797,370 B1
(45) Date of Patent: Sep. 28, 2004

(54) THIN-WALLED COMPONENT MADE FROM HYDRAULICALLY HARDENED CEMENT PASTE MATERIAL AND METHOD FOR THE PRODUCTION THEREOF

(75) Inventors: Christian Bechtoldt, Wiesbaden (DE); Rolf-Rainer Schulz, Neu-Anspach (DE)

(73) Assignee: Dyckerhoff AG (DE)

( * ) Notice: Subject to any disclaimer, the term of this patent is extended or adjusted under 35 U.S.C. 154(b) by 0 days.

(21) Appl. No.: 09/807,871

(22) PCT Filed: Sep. 15, 1999

(86) PCT No.: PCT/EP99/06821

§ 371 (c)(1), (2), (4) Date: Jun. 6, 2001

(87) PCT Pub. No.: WO00/23671

PCT Pub. Date: Apr. 27, 2000

(30) Foreign Application Priority Data

Oct. 20, 1998 (DE) ........................................ 198 48 248

(51) Int. Cl.[7] ................................................ B32B 13/10

(52) U.S. Cl. .................... 428/294.7; 428/113; 428/218; 428/116; 428/175; 428/166; 428/107; 428/401; 264/344; 264/345; 264/904

(58) Field of Search ................................ 428/113, 166, 428/175, 218, 116, 294.7, 107, 295.4, 292.4, 299.1; 264/344, 345, 904

(56) References Cited

U.S. PATENT DOCUMENTS

| | | | | | |
|---|---|---|---|---|---|
| 3,637,457 | A | * | 1/1972 | Gothard et al. | 161/140 |
| 4,414,262 | A | * | 11/1983 | Hartmann et al. | 428/222 |
| 4,617,219 | A | * | 10/1986 | Schupack | 428/113 |
| 5,571,628 | A | * | 11/1996 | Hackman | 428/605 |
| 6,174,595 | B1 | * | 1/2001 | Sanders | 428/295.4 |

* cited by examiner

*Primary Examiner*—Merrick Dixon
(74) *Attorney, Agent, or Firm*—Blank Rome LLP

(57) ABSTRACT

The invention relates to a thin-walled component with a fine cement paste matrix and at least one steel wool mat that is pressed together and embedded in the fine cement paste matrix. The invention also relates to a method for producing a thin-walled component, whereby at least one steel wool mat is pressed together in a perpendicular position with respect to the main extension thereof, injected with a fine cement suspension, surrounded and the suspension is hardened.

54 Claims, 1 Drawing Sheet

THIN-WALLED COMPONENT MADE FROM HYDRAULICALLY HARDENED CEMENT PASTE MATERIAL AND METHOD FOR THE PRODUCTION THEREOF

The invention relates to a thin-walled, sheet-like component of high strength comprising hydraulically cured concrete and to a process for producing it.

Cured mortars reinforced with steel fiber mats are known under the name "slurry infiltrated mat concrete", hereinafter also referred to as SIMCON. Such concrete is produced by firstly preparing a flowable mortar from portland cement, water, sand, microsilica and superfluidizer and, for example, pouring it into a mold in which a steel fiber mat is located, so that the steel fiber mat is impregnated with mortar. Curing results in a concrete reinforced with steel fibers which has a considerably higher ductility and a more favorable crack distribution which gives higher strength on overloading compared to an unreinforced concrete. SIMCON is used to produce, for example, covering layers on components or lost shuttering (ACI Structural Journal/September–October 1997, pp. 502–512). However, only relatively thick and flat components having a minimum thickness of, for example, from 15 to 20 mm can be produced from SIMCON because the steel fiber mats are relatively thick and complete incorporation of the mats with flowable fresh mortar is relatively difficult.

It is an object of the invention to provide thin-walled components of high elasticity, in particular in respect of elastic bending, and high performance on the basis of cured concrete reinforced with steel fiber mats and also to provide a process for producing it by means of which not only thin-walled, flat components but also thin components having any curved or angled shapes can be produced.

These objects are achieved by the features of claims 1 and 24. Advantageous embodiments of the invention are defined in the subordinate claims dependent on these main claims.

The invention provides for the use of commercial, compressed mats of steel wool. Preference is given to using stainless steel wool mats which have a higher strength and a very low oxidation rate and therefore have long-term corrosion resistance in the presence of, for example, water and/or moisture.

The stainless steel wool is, for example, produced from the material No. DIN 1.4113 or 1.4793 or from stainless alloy steels. Different mats have fibers of different fineness; for example, a mat having a mean fiber diameter of 0.08 mm is chosen for components having a thickness of ≦5 mm, while coarser, medium fiber diameters of, for example, 0.12 mm are suitable for components having a greater thickness. The fiber lengths are in the range from about 20 mm to a number of meters; their average length is a number of decimeters.

This long-fiber stainless steel wool is elastic and tough. The fibers have length/diameter ratios (L/D ratios) of over 1000. Accordingly, this ratio is far above the critical value at which an increase in fiber lengths still has a property-improving effect.

The mats are very flexible and bendable, have a width of up to 1 m and are available in weights per unit area of, for example, from 800 $g/m^2$ to 2000 $g/m^2$ rolled up into rolls. The mats can be cut with shears.

For the purposes of the invention, preference is given to using stainless steel wool having a weight per unit area of from 900 to 1000 $g/m^2$ and a mean fiber diameter of from 0.08 to 0.12 mm.

In combination with the selected and compressed steel wool mat product in the form of steel wool fibers, in particular stainless steel wool, use is made of a suspension based on superfine cement.

Superfine cements are very fine hydraulic binders which are characterized by their chemomineralogical composition and a continuous and gradated particle size distribution. They generally comprise the customary cement raw materials such as milled portland cement clinker and/or milled slag sand and setting regulators; they are produced in separate production plants in cement works. The individual milling of the mineral starting materials, separation of their very fine constituents and their targeted composition in respect of, inter alia, particle sizes and particle size distribution are particularly advantageous.

The important feature of superfine cements which distinguishes them from conventional standard cements, e.g. in accordance with DIN 1164, is the comparatively great fineness of these binders together with the limitation of their largest particles, which is usually indicated by reporting of the particle diameter at 95% by mass of the mixture, namely $d_{95}$.

Preference is given to using superfine cements based on slag sand or portland cement having a continuous and gradated particle size distribution having a $d_{95} \leqq 24$ μm, preferably ≦16 μm, and a mean particle size $d_{50}$ of ≦7 μm, preferably ≦5 μm. These are converted into suspensions by mixing them with water and with at least one superfluidizer (these are highly effective fluidizers or flow improvers) and also, in particular, with microsilica. and/or pigments and/or inert mineral materials, e.g. ground limestone and/or quartz flour and/or fly ash, of the same or lower fineness as the superfine cement.

Microsilicas are products which are obtained in the processing of ferrosilicon. They are generally used in the form of aqueous dispersions as additives in high-performance concrete. This type of microsilica is known as "slurry". Essentially three independent effects can be distinguished in concrete with silicate additions:

filler effect;

pozzolanic reactions;

improvement of the contact zone between aggregate and cement matrix.

Microsilicas have very small particle diameters. They are in the region of about 0.1 μm. Owing to this property, they are able to fill the interstices between the cement particles. As a result, the packing density in the cement matrix is significantly increased. Although the particle diameter of the cement used is in the order of <9.5 μm, the microsilica particles are much larger, thus resulting in the filler effect.

The pozzolanic properties of the microsilicas are mainly determined by two properties. Firstly, they have a certain proportion of reactive, amorphous siliceous constituents which react with the calcium hydroxide formed during the hydration of cement. Secondly, they have a large specific surface area on which these reactions can take place.

For the purposes of the present invention, the effect of the microsilica in improving the contact zone between aggregate and cement matrix is not brought to bear, because the suspensions used according to the invention contain no siliceous aggregate.

According to the invention, microsilica is added, for example, in amounts of from 10 to 15% by weight, based on the solids content, to the suspension in the form of a dispersion which consists essentially of 50% by weight of microsilica and 50% by weight of water (slurry).

Superfine cements based on slag sand are particularly advantageous for the suspensions used according to the invention because the superfine cements, owing to their low reactivity, require lower water contents and lower contents of fluidizers and/or flow improvers to achieve low-viscosity properties compared to superfine cements based on portland cement.

Particularly suitable fluidizers or flow improvers are, for example, superfluidizers such as lignosulfonate, naphthalenesulfonate, melaminesulfonate, polycarboxylate, which are known as highly effective dispersants for producing superfine cement suspensions.

To produce the suspensions used according to the invention, use is made, in particular, of the following mixtures:

Superfine cement: from 30 to 100% by mass, in particular from 50 to 80, % by mass;

Fluidizer or flow improver (liquid): from 0.1 to 5% by mass, in particular from 0.5 to 4.0, % by mass;

Fluidizer or flow improver (pulverulent): from 0.1 to 2.5% by mass, in particular from 0.5 to 1.5, % by mass;

Microsilica (slurry): from 0 to 30% by mass, in particular from 5 to 15, % by mass;

Pigments (pulverulent): from 0 to 5% by mass, in particular from 1 to 3, % by mass;

Inert mineral materials: from 0 to 70% by mass, in particular from 10 to 30, % by mass;

Superfine fly ash: from 0 to 50% by mass, in particular from 10 to 30, % by mass;

in each case based on the solids content of the suspension.

The low-viscosity suspensions advantageously have a water/solids ratio of from 0.4 to 0.6. Their consistency, measured as the Marsh outflow time, is from 35 to 75 seconds.

To produce a suspension, the required amount of water is, for example, placed in a mixing vessel. The mixer is then started up and fluidizers or flow improvers are added. The previously weighed out dry materials are subsequently added. The mixture is then mixed further and homogenized.

BRIEF DESCRIPTION OF THE DRAWINGS

The invention is best understood by reference to the drawings in which.

Figure 1:
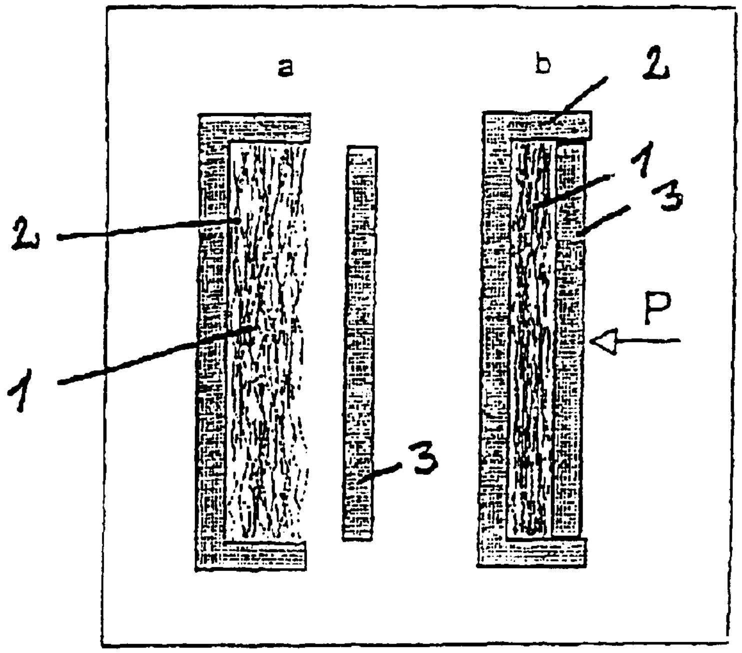
FIG. 1*a* shows a steel wool mat in an open shuttering mold.
FIG. 1*b* shows a steel wool mat compressed in accordance with the invention in a closed shuttering mold.

Since the mats are flexible and malleable, they can be matched to and pressed onto virtually any surface topographies. They can also be would around components or patterns. The mats are laid into a mold with the fiber orientation corresponding to the expected direction of tension or, if appropriate, fixed at points on the components preset and are compressed to the desired thickness by applying a shuttering element or the second half of the shuttering under an appropriate pressure. This procedure is shown in FIG. 1. The wool 1 is introduced into a first shuttering element 2 (process step a) and compressed by means of a second shuttering element 3 (arrow P, process step b).

The degree of reinforcement (proportion by volume of the steel wool fibers) is controlled by means of the compaction of the steel wool. Since steel wool fibers are also present on the surface of the component, stainless steel wool is used, particularly in cases in which the component is exposed to aggressive media. It is surprising that even steel wool mats compressed to from 10 to 20% of their delivered state can be completely and reliably filled with superfine binder suspensions. This is particularly astonishing because at fiber contents above about 6% by volume the mats have to be compacted so much that an apparently impenetrable felt is formed.

To achieve very complete and controlled filling of the hollow spaces between the shuttering elements, the shuttering is sealed at the edges and the suspension is introduced under pressure into the shuttering containing the compressed steel wool mat, with air outlet holes being provided so that the air displaced by the suspension in the shuttering can escape.

Figure 2:
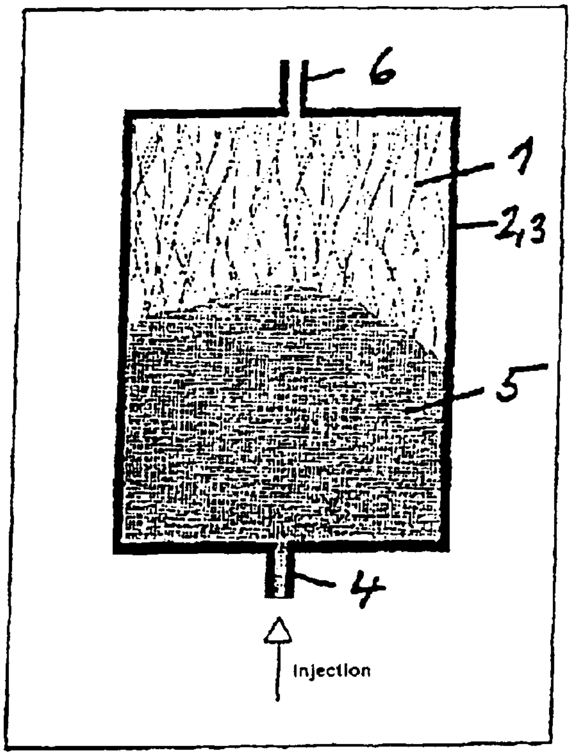
FIG. 2 schematically shows the injection process of the invention.

The principle of this process is shown by way of example in FIG. 2. Suspension 5 is injected from below in a direction opposite to that of gravity via an inlet 4 into the edge-sealed shuttering 2,3 until the shuttering has been filled. The air can escape in an upward direction through the outlet 6. After curing of the suspension to form concrete, the shuttering is removed. The thin-walled component consists essentially of concrete and at least one compacted steel wool mat. It has unusually high strengths, plastic deformation capability, workability, energy absorption to fracture and elasticity, as a result of which such a thin component can be used as self-supporting building material. For example, it is possible to produce components less than 10 mm thick which have the following properties:

Thickness: from 4 to 8 mm

Bending tensile strength: up to 80 $N/mm^2$

Compressive strength: up to 70 $N/mm^2$

Workability: very high

Impermeability, including against water: very high

It is surprising that the process of the invention allows the production of thin-walled components using suspensions which normally do not result in high bending tensile strengths because of the high water/cement ratio. It is surprising that the process of the invention achieves the abovementioned properties using suspensions which, owing to their comparatively high water/cement ratio, would normally not lead one to expect such high bending tensile strengths. In the case of SIMCON having a steel fiber content of about 6% by volume and a very low water/cement ratio of <0.4, only about half of the above bending tensile strength is achieved. Owing to this surprisingly high strength, it is possible to produced thin-walled self-supporting components.

It is also surprising that, owing to the injection process, the thin-walled components consist essentially of cement matrix on their surface, while the steel wool fibers touch only a fraction of the surface of the finished component despite the high pressure applied by the shuttering.

The process of the invention allows the production of various types of cement-bonded moldings which are very thin-walled and highly reinforced and which can additionally be given virtually any shape and, if desired, any surface structure. Examples of applications are:

sheets;

shells;

pipes and moldings having virtually any cross sections;

which can be used as roof and wall cladding or for sheathing or cladding components to be protected or to be covered.

Such covering materials may be filled with mineral insulating materials (e.g. foamed concrete) and may serve as highly effective fire protection cladding. Such sheets, shells and moldings can, if necessary, be stiffened by appropriate shaping. To achieve a high degree of prefabrication and a high degree of efficiency on the building site, half shells produced in the factory can be placed over the pipes or steel, wooden or plastic components to be clad in a manner similar to plastic cable ducts and subsequently joined together. The joints can be sealed using commercial materials and the hollow spaces can be filled with insulation material via filling ports.

Owing to the ability to achieve virtually any color, shape or surface structure and in particular owing to the high water impermeability and the excellent mechanical properties, the material of the invention can also be used as covering layer, e.g. for sandwich components. An example of such novel sandwich components are fire doors. For the same reasons, the novel structural material is also suitable as external skin for steel-reinforced concrete components, with this external skin being used as lost shuttering. Owing to the ability to manufacture the thin-walled fiber-reinforced material in a factory, a high degree of prefabrication can also be achieved, e.g. in the case of strut and beam shuttering, with spacers for the normal reinforcement being able to be integrated into it. A particular advantage is that such lost shuttering makes the after-treatment of the steel-reinforced concrete introduced unnecessary, increases the density, thereby reduces the carbonation rate and thus improves corrosion protection of the reinforcing steel. In the case of factory-made shuttering elements, the quality of the surface can be made far more uniform and controlled much better than in the case of concrete components produced on site. Coloring by means of expensive and complicated-to-use pigments is restricted to only the few millimeters of external skin. A good mechanical bond between external skin and steel-reinforced concrete introduced could be achieved by means of knobs or suitable structuring on the inside.

The structural material of the invention is also suitable as repair material. Complete covering layers or localized patches can be applied to damaged steel-reinforced concrete surfaces. For this purpose, the faulty areas and hollows are stuffed with steel wool mats, shuttered, sealed and subsequently injected. Covering layers can also be applied by the lost shuttering method and can be backfilled by injection. Owing to the low viscosity of the suspension and the fineness of the binder and owing to the filling of the shuttering under pressure, complicated surface structures can also be molded. The invention can therefore also be utilized for producing reliefs and sculptures, which is of particular advantage if the objects to be produced are subjected to particular mechanical stresses.

The process of the invention can be employed regardless of the orientation of the component; overhead applications, e.g. on undersides of components, are therefore also possible, in contrast to the SIMCON method.

The compression of the steel wool mats obviously produces a novel product which only in this way becomes usable for the purposes of the invention. In combination with the suspensions based on superfine cement, the compressed structure of the steel wool can interact with the cured suspension medium to produce a novel component having unexpected properties.

What is claimed is:

1. A fiber-reinforced, thin-walled component comprising a cement matrix made of a superfine cement and fluidizers, and a plurality of superposed, compressed steel wool mats, wherein the outer surfaces of the component are virtually free of said steel wool fibers.

2. A component as recited in claim 1, wherein the main surfaces of said component are smooth and essentially superfine cement material is present on the surfaces.

3. A component as recited in claim 2, wherein said steel wool mats are arranged so that the main directions of the steel wool fibers of the steel wool mats cross.

4. A component as recited in claim 1, wherein the content of steel wool mats ranges from 2 to 10% by volume.

5. A component as recited in claim 1, having a thickness of from 3 to 10 mm.

6. A component as recited in claim 1, having a bending tensile strength of from 25 to 80 $N/mm^2$.

7. A component as recited in claim 1, having a compressive strength of from 30 to 75 $N/mm^2$.

8. A component as recited in claim 1, wherein the component is colored by means of pigments.

9. A component as recited in claim 1, wherein the component has a curved shape.

10. A component as recited in claim 1, wherein the component has a shuttering structure on its main surfaces.

11. A component as recited in claim 1, wherein said steel wool fibers of the steel wool mats have a mean fiber diameter of from 0.05 to 0.20 mm.

12. A component as recited in claim 1, wherein said steel wool mats have a weight per unit area of from 600 to 2000 $g/m^2$.

13. A component as recited in claim 1, wherein said steel wool fibers have a length/diameter ratio of over 1000.

14. A component as recited in claim 1, wherein said superfine cement matrix comprises microsilica in amounts of from 0 to 30 wt. %.

15. A component as recited in claim 1, wherein said superfine cement matrix includes pigments in amounts from 0 to 5 wt. %.

16. A component as recited in claim 1, wherein said superfine cement matrix includes inert minerals in amounts of from 0 to 70 wt. %.

17. A component as recited in claim 1, wherein said superfine cement matrix includes quartz flour ranging from 0 to 70 wt. %.

18. A component as recited in claim 1, wherein said superfine cement matrix includes superfine fly ash ranging from 0 to 50 wt. %.

19. A component as recited in claim 1, wherein said superfine cement matrix includes portland cement.

20. A component as recited in claim 1, wherein said superfine cement matrix is a slag cement matrix.

21. A component as recited in claim 1, wherein said compressed steel wool mats are from 3 to 10 mm thick.

22. A process for producing a thin-walled component reinforced with metal fibers, as recited in claim 1, comprising the steps of forming a thin wall using a plurality of steel wool mats which are superposed and compressed perpendicular to their respective main elongation in shuttering; after compression, a suspension comprising superfine cement and a highly effective fluidizer is injected into the shuttering and the steel wool mats; after the suspension is allowed to cure, the component is removed from the shuttering mold.

23. The process as recited in claim 22, wherein stainless steel wool mats are used.

24. The process as recited in claim 22, wherein said steel wool mats include steel wool fibers which have mean fiber diameters of from 0.05 to 0.20 mm.

25. The process as recited in claim 22, wherein said steel wool mats have fibers in which the fiber lengths are from 20 mm to a plurality of meters.

26. The process as recited in claim 22, wherein said steel wool mats include fibers having a length/diameter ratio of over 1000.

27. The process as recited in claim 22, wherein said steel wool mats have a weight per unit area of from 600 to 2000 $g/m^2$.

28. The process as recited in claim 22, wherein said steel wool mats are compressed by about 10 to 20% of their thickness.

29. The process as recited in claim 22, wherein two steel wool mats are used and the main direction of the fibers of one steel wool mat is positioned at an angle to the main direction of the fibers of the other steel wool mat.

30. The process as recited in claim 22, wherein a superfine cement suspension comprising slag sand and activators is used.

31. The process as recited in claim 22, wherein a suspension comprising superfine portland cement is used.

32. The process as recited in claim 31, wherein said superfine cement suspension has a graduated particle size distribution and a $d_{95}$ of $\leqq 24\ \mu m$.

33. The process as recited in claim 32, wherein said superfine cement has a mean particle size $d_{50}$ of $\leqq 7\ \mu m$.

34. The process as recited in claim 33, further including a dispersion of microsilica.

35. The process as recited in claim 33, further including a pigment.

36. The process as recited in claim 33, wherein a mineral material having at least the same fineness as the superfine cements is added.

37. The process as recited in claim 33, further including naphthalenesulfonate as an effective fluidizer.

38. The process as recited in claim 33, further including a polycarboxylate as a superfluidizer.

39. The process as recited in claim 22, wherein the following compositions are used for producing the suspension based on superfine cement:

| | |
|---|---|
| Superfine cement: | from 30 to 100 wt. % |
| Fluidizer or flow improver (liquid) | from 0.1 to 5 wt. % |
| Fluidizer or flow improver (pulverulent) | from 0.1 to 2.5 wt. % |
| Microsilica (slurry) | from 0 to 30 wt. % |
| Pigments (pulverulent) | from 0 to 5 wt. % |
| Inert mineral materials | from 0 to 70 wt. % |
| Superfine fly ash | from 0 to 50 wt. % |

based on the solids content of the suspension.

40. The process as recited in claim 22, wherein said suspensions have a water/solids ratio of from 0.4 to 0.6.

41. The process as recited in claim 22, wherein said suspensions have a consistency, measured as the Marsh outflow time, of from 35 to 75 seconds.

42. The process as recited in claim 22, wherein said suspensions are produced by placing the required amount of water in a mixing vessel and adding the fluidizer or flow improver while mixing, then adding the previously weighed out dry materials and continuing to mix and thus homogenize the mixture.

43. The process as recited in claim 22, wherein said steel wool mats are compressed between sealed shuttering and the superfine cement suspension is injected under pressure into the shuttering, with an air outlet being provided so that the air can escape from the space within the shuttering during injection.

44. The process as recited in claim 43, wherein said injection is carried out in a direction opposite to that of gravity.

45. The process as recited in claim 22, wherein said components have a final thickness of ≦10 mm.

46. The component as recited in claim 22, in the form of a roof and/or exterior wall and/or wall cladding.

47. The component as recited in claim 22 in the form of a sheathing or cladding.

48. The component as recited in claim 22, in the form of half shells for producing and sheathing channels, pipes or the like.

49. The component as recited in claim 22, in the form of a sandwich element for producing fire doors.

50. The component as recited in claim 22, in the form of an external skin for steel-reinforced concrete components.

51. The component as recited in claim 49, wherein the external skin is lost shuttering.

52. The component as recited in claim 22, in the form of lost shuttering.

53. The component as recited in claim 22, in the form of a material, wherein faulty areas and/or hollows in damaged concrete surfaces are stuffed with at least one steel wool mat, the mat is compressed and subsequently shuttered, sealed and the suspension is injected.

54. The component as recited in claim 22, for molding complicated surface structures.

* * * * *